(12) United States Patent
Baldwin et al.

(10) Patent No.: US 6,357,176 B2
(45) Date of Patent: *Mar. 19, 2002

(54) SOILLESS SOD

(75) Inventors: Brian S. Baldwin; J. Michael Goatley, Jr.; Marty J. Fuller; Nancy A. Reichert; Kevin L. Hensler, all of Mississippi State, MS (US)

(73) Assignee: Mississippi State University, Mississippi State, MS (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/825,550

(22) Filed: Mar. 19, 1997

(51) Int. Cl.⁷ .................................................. A01C 1/04
(52) U.S. Cl. ........................................................... 47/56
(58) Field of Search ............................ 47/56, 1.01, 58, 47/58.1, 1.01 F, 9

(56) References Cited

U.S. PATENT DOCUMENTS

| | | | | | |
|---|---|---|---|---|---|
| 3,890,910 A | * | 6/1975 | Angruner | .................. | 47/56 |
| 4,099,345 A | * | 7/1978 | Loads | .................. | 47/56 |
| 4,219,966 A | * | 9/1980 | McCalister | .................. | 47/9 |
| 4,232,481 A | * | 11/1980 | Chamoulaud | .................. | 47/56 |
| 4,336,668 A | * | 6/1982 | Decker | .................. | 47/56 |
| 4,364,197 A | * | 12/1982 | Baron | .................. | 47/56 |
| 4,941,282 A | * | 7/1990 | Milstein | .................. | 47/56 |
| 5,205,068 A | * | 4/1993 | Solomou | .................. | 47/56 |
| 5,224,290 A | * | 7/1993 | Molnar et al. | .................. | 47/56 |
| 5,226,255 A | * | 7/1993 | Robertson | .................. | 47/56 |
| 5,301,466 A | * | 4/1994 | Egan | .................. | 47/56 |
| 5,415,736 A | * | 5/1995 | Grether | .................. | 47/56 |
| 5,718,802 A | * | 2/1998 | Collier et al. | .................. | 162/21 |
| 6,286,253 B1 | * | 9/2001 | Decker | .................. | 47/56 |

* cited by examiner

Primary Examiner—Peter M. Poon
Assistant Examiner—Jeffrey L. Gellner
(74) Attorney, Agent, or Firm—Piper Marbury Rudnick & Wolfe, LLP; Steven B. Kelber

(57) ABSTRACT

A soil- and grass seed-less sod precursor containing a non-woven bio-cellulosic fiber mat and grass sprigs. The sod precursor can be used to produce a soil-free sod which is useful for manufacturing athletic fields, golf courses and lawns.

14 Claims, No Drawings

SOILLESS SOD

BACKGROUND OF THE INVENTION

1. Field of the Invention

The present invention relates to a soil- and grass seed-free sod precursor containing grass sprigs and a non-woven bio-cellulosic fiber mat and a method of producing a soilless sod from the precursor.

2. Description of the Background

In the past, washed sod and soilless sod have been interchangeable terms. However, these materials are quite distinct. Washed sod is field-cut sod in which the soil has been mechanically removed from the turfgrass plant. In contrast, soilless sod is grown without any type of mineral soil substrate.

Washed sod technology was introduced by Warren's Turf Nursery of Palos Park, Ill. in the 1970's (see Turgeon, A. J., Comparative Advantages of Soilless Sod for Kentucky Bluegrass, *Rasen Grun-flachen Begrunungen* 8(1):13–15, 1977). This sod results from a post-harvest washing using a patented washing apparatus consisting of three motorized conveyors passing through two series of high pressure water jets. The apparatus requires three operators, and has a capacity of two 182.9 cm×41.9 cm sod strips per minute. The advantages of washed sod include: elimination of layering due to soil differences between sod source and destination, quick rooting establishment, ease of handling, and light weight for shipping. Washed sod has superior water infiltration rates as compared to traditional field-cut sods (see Casimaty, B. G., J. Neylan, J. B. Beard, 1993, Effects of Removal by Post-Harvest Hydraulic Washing on Sod Transplant Rooting of a Kentucky Bluegrass-Perennial Ryegrass Polystand and a Creeping Bentgrass Monostand, In R. N. Carrow, N. E. Christians, and R. C. Shearman (co-ed.), *Int. Turfgrass Soc. Res. J.,* Vol. 7). However, washed sod can be expensive to produce, and soil removal can be difficult to accomplish while still maintaining sod integrity.

As an alternative to washed sod, methods of growing sod over an impervious plastic layer have been investigated. Some of these methods use soil as a substrate, while others utilize some form of natural or man-made organic fiber mat.

Baron, U.S. Pat. No. 4,364,197, used two layers of a non-woven organic fiber mat composed primarily of flax. A cool-season grass mix was seeded between the two layers.

Anton, U.S. Pat. No. 5,224,292, discloses growing grass seeds on a non-woven mat composed of hollow synthetic organic fibers. These hollow fibers can contain water-soluble plant nutrients, pesticides, algaecides, or weed controls within their matrix, thereby providing slow-release of the chemicals to enhance and/or protect growing seedlings.

Heard, U.S. Pat. No. 4,716,679, produced pre-grown turf by seeding grass on a layer of straw deposited on an impervious surface. Chamoulaud, U.S. Pat. No. 4,232,481, produced sod by applying grass seed to a finely crushed wood bark compost layer. Burns, looking for methods to decrease sod establishment times, grew sprigged 'Tifway' bermudagrass [*Cynodon dactylon* (L.) Pers. x *transvaalensis* Burtt-Davy] on 8 mm of sewage sludge from a secondary treatment plant (see Burns, R. E., 1980, Techniques for Rapid Sod Production, pp. 361–366, In J. B. Beard (ed.), *Proc. 3rd Int. Turfgrass Res. Conf.,* Munich Germany, 11–13 July 1977, Int. Turfgrass Soc., and ASA, CSSA, and SSSA, Madison, Wis.).

These methods all have serious drawbacks. Grass seeds require germination. As a result, sod production is relatively slow because the seeds must germinate and grow before the grass plants can root into the growth media. Also, the conditions that are most favorable conditions for seed germination may be different than the conditions for optimal growth of the grass plants. This makes the process of producing the sod difficult to automate because the environmental conditions must be adjusted after seed germination in order to maximize growth of the grass plants.

In addition, sod carpets produced from straw, finely crushed wood bark compost or secondary sewage sludge lack sufficient mechanical stability and are difficult to handle. Synthetic organic fibers may not be biodegradable and, if they do degrade, may produce toxic by-products. Soilless sod prepared from flax fibers as disclosed by Baron appears to require the use of polystyrene marbles to provide sufficient aeration for the germinating seeds. These polystyrene materials may suffer from the same drawbacks as synthetic organic fibers noted above.

Accordingly, there remains a need for a soilless sod which overcomes these disadvantages.

OBJECTS OF THE INVENTION

Accordingly, it is an object of the present invention to provide a soilless sod with a high degree of mechanical stability.

It is another object of the present invention to provide a soilless sod which can be prepared in less time as compared to a mat-based sod grown from grass seeds or traditional field-grown sod.

It is another object of the present invention to provide soilless sod which is composed of primarily of biodegradable materials.

It is another object of the present invention to provide a method for preparing a soilless sod having the properties described above.

SUMMARY OF THE INVENTION

The above objects and others are accomplished with a soil- and grass seed-free sod precursor containing grass sprigs and a non-woven mat made of bio-cellulosic fibers.

The objects above are also accomplished with a method of producing the sod precursor by applying grass sprigs to a soil- and grass seed-free non-woven mat made of bio-cellulosic fibers.

The above objects are also accomplished by a method of producing a soil-free sod by applying grass sprigs to a soil- and grass seed-free non-woven mat made of bio-cellulosic fibers and providing the sprigs with essential nutrients and water.

A more complete appreciation of the invention and many of the attendant advantages thereof will be readily obtained as the same becomes better understood by reference to the following detailed description.

DETAILED DESCRIPTION OF THE INVENTION

The present invention is directed to a soilless sod in which a soil- and grass seed-free non-woven bio-cellulosic fiber mat serves as a substrate for transplanted grass sprigs. The term "sod" as used herein refers to a grass turf held together by intermeshed grass roots and mat fibers.

The terms "soilless" and "soil-free" as used herein refer to a sod and a mat which are substantially free of soil. The term "substantially free of soil" as used herein means that the sod does not contain mineral soil as a growth medium. This term includes small amounts of soil that may adhere to the grass sprigs during harvesting, for example. This term explicitly excludes amounts of soil which supply the grass sprigs with enough nutrients such that they are capable of growing without artificial nutrient sources, such as fertilizers.

Applying the grass sprigs to the mat produces a soilless sod precursor, i.e., a composition containing the sprigs and the mat which is not held together by intermeshed roots and mat fibers. A sod is produced after the sprigs have grown into the mat.

A grass sprig is generally recognized to include a stolon. A stolon (also known as a runner) is a grass stem that grows horizontal to and above the surface of the ground. A stolon may contain one or more nodes from which roots will grow. Some of the nodes may have roots when the sprig is harvested. A sprig may also be a rhizome, which is generally recognized as a grass stem that grows under the surface of the soil.

The term "grass sprig" as used herein excludes grass seed. Sprigs are distinguishable from seeds in terms of gross biological morphology and genetic composition. In terms of morphology, grass seeds contain the plant embryo and a food source enveloped in a protective seed coat. In contrast, sprigs are not grass plant embryos and do not contain seed coats. Genetically, every grass seed collected from the same mother plant is different because a seed is the product of sexual reproduction. In contrast, sprigs harvested from the same mother plant will all be substantially the same genetically because they are clones of the mother plant. Therefore, sod grown from grass sprigs is distinguishable from sod prepared from seeds. In a sprig-grown sod, the individual grass plants will be substantially identical genetically. In contrast, each grass plant in a seed-grown sod is genetically different. Determining whether the grass plants in a sod are genetically the same or different may be accomplished using DNA fingerprinting techniques well-known to those of skill in the art. For example, see G. Caetano-Anolles, L. M. Callahan, P. E. Williams, K. R. Weaver and P. M. Gresshoff, DNA Amplification Fingerprinting Analysis of Bermudagrass (Cynodom): Genetic Relationships between Species and Interspecific Crosses, *Theor. Appl. Getnetics* 91, pp. 228–235, 1995 and K. R. Weaver, L. M. Callahan, G. Caetano-Anolles and P. M. Gresshoff, DNA Amplification Fingerprinting and Hybridization Analysis of Centipedegrass, *Crop Sci.* 35, pp. 881–885, 1995, both incorporated herein by reference.

The sod precursor is substantially free of grass seeds, as well as products that result from degradation of grass seed following germination (such as seed hulls). As used herein, the term "substantially free of grass seeds" means that the sod may contain a very small number of seeds that may be collected when the grass sprigs are harvested from the mother plant, for example. The sod of the present invention excludes a grass-fiber mat composition that is grown predominantly from grass seeds. It is to be understood that the sod produced from the precursor may contain seeds, because the mature grass plants growing on the mat may produce seeds.

After the sprigs are applied to the mat, roots and lateral stems (stolons and rhizomes) grow from the nodes and into the upper surface the mat. At least a portion of the roots, stolons and/or rhizomes form an intermeshed network on the upper surface of the mat. In addition, at least a portion of the roots may grow into the mat. Preferably, a significant portion of the roots grow into the mat. At least a portion of the roots in the mat will intermesh with each as other and the fibers of the mat. These intermeshed networks of grass plants and mat fibers afford a sod carpet with significant mechanical strength. A portion of the roots may grow through the mat and form a network on the lower surface of the mat, which further increases the mechanical stability, particularly the shear strength, of the sod. After growth is complete, the sod may be rolled up, transported and applied to a soil substrate. Once applied, the sod grows into the soil substrate to produce a lawn.

The term "non-woven" refers to a mat comprising bio-cellulosic fibers that is produced by a method other than weaving. Non-woven fiber materials are discussed in *Kirk-Othmer Encyclopedia of Chemical Technology*, Fourth Edition, Volume 10, pages 546–547, incorporated herein by reference.

The term "bio-cellulosic fiber" is defined herein as a naturally occurring fiber which is isolated from a plant and which contains cellulose. Bio-cellulosic fibers are also known as vegetable fibers. This term includes fibers that may be processed, e.g., retted, boiled and/or bleached, after isolation from the natural source. Bio-cellulosic fibers include regenerated cellulose fibers, such as rayon. This term does not include natural cellulose-based fibers which have been transformed by covalent chemical modification, such as cellulose esters (e.g., cellulose acetates) or synthetic organic polymers, e.g., acrylic polymers, polyesters, polyamides, etc. It is to be understood that while the term "bio-cellulosic fiber" does not include cellulose esters or synthetic organic polymers, the mat may contain these materials in addition to the bio-cellulosic fiber. Bio-cellulosic fibers are extensively discussed in *Kirk-Othmer Encyclopedia of Chemical Technology*, Fourth Edition, Volume 10, pages 727–744, incorporated herein by reference in its entirety.

The bio-cellulosic fiber may be a bast fiber (also known as a stem fiber), leaf fiber (also known as a soft fiber) or a seed-hair fiber. Bast fibers include kenaf, roselle, flax, hemp, Chinese jute, jute, ramie, Sunn hemp, and nettle. Leaf fibers include abaca, phormium, sisal, cantala, caroa, henequen, istle, Mauritius, hesperaloe, New Zealand flax and sansevieria. Seed-hair fibers include coir, cotton and kapok. Preferably, the mat comprises bast fibers. Kenaf and roselle fibers are particularly preferred. Kenaf is most preferred. The mat may contain a mixture of different bio-cellulosic fibers, i.e., the mat comprises at least one type of bio-cellulosic fiber.

The bio-cellulosic fiber preferably contains at least 40 wt % cellulose, more preferably at least 75 wt %, even more preferably 85 wt % and most preferably at least 95 wt % cellulose. These ranges of cellulose content in the fiber explicitly includes all specific values and subranges therebetween, including at least 45, 50, 55, 60, 70, 80, 85, 90, 91, 92, 93 and 94 wt % cellulose. The fiber may also contain 0 to 50 wt % of lignin, 0 to 25 wt % of pectins, 0 to 25 wt % of hemicellulose and 0 to 10 wt % of other extractives. These ranges for the lignin, pectins and other extractives in the fiber explicitly include all specific values and subranges therebeteen.

The mat may contain 40 to 100% by weight of the bio-cellulosic fiber. Preferably, the mat contains 45 to 100%, more preferably 50 to 100%, even more preferably 75 to 100% and most preferably 95 to 100% by weight of the bio-cellulosic fiber, based on the total weight of the mat. In a particulary preferred embodiment the mat contains 100% by weight of the bio-cellulosic fiber. These weight percent ranges explicitly include all specific values and subranges therebeteen, including 55, 60, 65, 70, 80, 90, 97 and 99% by weight. It is to be understood that these weight ranges refer to the dry weight of the mat before grass sprigs are applied, i.e., these ranges are based on the total weight of the mat only.

The mat may contain other materials in addition to the bio-cellulosic fiber. The mat may contain other types of fibers, such as wood fibers or synthetic organic fibers. Wood fibers may increase the water retention of the mat. Examples of organic fibers include acrylic, cellulose ester (such as cellulose acetates), elastomeric, olefin, polyester, polyamide (such as nylons) and poly(vinyl)alcohol fibers. A detailed description and specific examples of synthetic organic fibers is provided in *Kirk-Othmer Encyclopedia of Chemical Technology*, Fourth Edition, Volume 10, pages 539–726, incorporated herein by reference in its entirety. A synthetic organic polymer may function as a binder agent. The mat may also contain non-fibrous polymers, such as polysaccharides (such as starch), proteins, polyacrylamide and other water-retention agents.

The weight of the mat may vary widely to accomodate plant species differences. The mat may have a weight of 100 to 1200 g m$^{-2}$. Preferably, the weight is 200 to 1400 m$^{-2}$, more preferably 250 to 1200 g m$^{-2}$ and most preferably 500 to 1100 g m$^{-2}$. These weight ranges explicitly include all specific weight values and subranges therebetween, including 150, 300, 325, 400, 600, 650, 700, 800, 900, 975 and 1000 g m$^{-2}$.

The mat may comprise one or more individual layers of fiber material. One to four layers is preferred. Multiple layers are preferably stacked directly on top of each other. The individual layers may be lightly stitched together (e.g., spun woven) to facilitate handling. The total thickness of the mat is not particularly limited. The total thickness is preferably 0.1 to 1 inch, more preferably 0.2 to 0.9 inch, even more preferably 0.4 to 0.8 inch and most preferably 0.5 to 0.8 inch. These mat thickness ranges include all specific values and subranges therebetween. The length and width of the mat are not particularly limited. Preferably, the mat has a length and width which makes it easy to roll and transport before applying the sprigs and after production of the sod turf. A particularly preferred size is 1 m wide and 15 m long.

The mat is preferably biodegradable. The term "biodegradable" means that the mat will degrade when the sod is applied to a soil substrate. Preferably, the mat is made of materials that have a fertilizing effect on and/or are non-toxic to the grass during decomposition. It is to be understood that time required for biodegradation depends on many environmental variables, including the time of year the sod is applied and local weather conditions (temperature and the relative amounts of sunlight, rain, etc.). Biodegradation preferably takes 6 to 18 months.

The mat may be prepared by techniques well-known to those of skill in the art. Commercial producers utilize "line production" of an air-laid web. Fiber is fed to a opener, blown to a mixer and then blown to a RANDO Webber. The webber blows out a web of fiber onto a chain belt which immediately passes under a roller and into an oven. The oven sterilizes the fibers and melts the binding agent. Additional rollers compress the hot mat to a uniform thickness. As the mat cools, it is cut and rolled to the appropriate length. Mats may also be made by floating an appropriate weight of fiber on water in a tank having a wire screen, transferring the fibers to the screen by removing the screen from the tank and then drying the resulting fiber mat. Examples of other suitable mats are disclosed in U.S. Pat. No. 4,364,197. The preferred kenaf mats are available commercially as a 100% kenaf mat from Mississippi MAT-Line/Agro-Fibers, Inc. (Charleston, Miss., USA) or Mat Inc. (Floodwood, Minn., USA).

The grass sprigs are not particularly limited. Preferably, the sprigs are of grass varieties that are recognized as useful for athletic fields, golf courses and/or residential or commercial lawns. The sprigs may be of a warm or a cool season grass. Non-limiting examples of warm season grasses include bahaigrass [*Paspalum notatum* Flugge.], bermudagrass [*Cynodon dactylon* (L.) Pers. 'Common'; *C. dactylon* x *C. transvaalensis* Buritt-Davy 'Tifway', 'Tiffgreen', 'Tidwarf'; *C.x magenissi* Hurc. 'MS Express'], buffalograss [*Buchloe dactyloides* (Nutt.) Engelm.], centipedegrass [*Eremochloa ophiuroides* (Munro.) Hack. 'Common'], St. Augustinegrass [*Stenotaphrum secundatum* (Walt.) Kuntze 'Raleigh'], zoysiagrass [*Zoysia japonica* Steud. 'Meyer' and 'Sunrise']. An example of a cool season grasses is creeping bentgrass [*Agrostis stolonifera* var. *palustris*]. The warm season grasses are preferred.

In a particularly preferred embodiment, the sprigs are of a warm season grass that is incapable of reproducing by seeds, i.e., a sterile grass or ones with poor seed germination. A sterile grass may have a seedhead, but produces no viable seed. Sterile grasses are well known to those of ordinary skill in the art. For example, many of the improved varieties of bermudagrass are sterile. Zoysiagrass is preferably established by sprigs because seed germination is extremely poor (<3%). A soilless sod containing these grasses can only be made from sprigs. The sod may contain sprigs of a single grass variety. Alternatively, a mixture of sprigs of different grasses may be used.

The sprigs may be obtained using techniques well-known to those of skill in the art. For example, the sprigs may be harvested from field plots with a vertical mower (dethatcher). Suitable sprig harvesting apparatus are described in U.S. Pat. Nos. 5,528,890, 5,417,293, 3,589,319 and 3,939,785, all of which are incorporated herein by reference. After harvesting, the sprigs are preferably kept moist and cool and away from direct sunlight. Preferably, the sprigs are planted within 24 hours after harvesting, and more preferably, sooner. Sprigs may also be obtained commercially, for example from MS Grass Nursery (Hattiesburg, Miss. USA) and Rainey Sod Farm (Corinth, Miss. USA).

The sprig density on the mat is preferably chosen to produce rapid coverage of the mat and minimize sprig crowding during growth. The sprig density may be 0.05 to 1.5 $m^3$ are$^{-1}$. Preferably, the sprig density is 0.1 to 1.2, more preferably 0.25 to 0.9 and most preferably 0.25 to 0.75 $m^3$ are$^{-1}$. These ranges include all specific values and subranges therebetween.

The sod may be prepared by applying the grass sprigs to the upper surface of the mat using techniques well-known to those of ordinary skill in the art. For example, commercial row planters may be used drop the sprigs on the surface of the mat, see R. Jensen, Planting a Large Turf Area, Proc. Of the Univ. Of Florida Turfgrass Management Conference: 8, pp. 130–132, 1965.

After application, the sprig roots grow into the mat as described above. Since the mat contains substantially no soil, the sprigs should be provided with essential nutrients and water. Of course, grass is a green plant and requires light for growth. The amount of light required may vary depending on the grass variety, as is well-known to those of skill in the art. Essential nutrients may be provided using any of the fertilizers well-known to those of ordinary skill in the art. Suitable fertilizers are disclosed in U.S. Pat. No. 4,941,282 (column 2), 5,224,292 (column 3), 4,364,197 (column 5) and 5,224,290 (column 7), all incorporated herein by reference. Preferably, the fertilizer is a mixture of water-soluble and slow-release fertilizers. Nitrogen gas may also be applied in addition to fertilizer. Water is preferably provided to the growing sod carpet on an as-needed basis to prevent dessication. Other water-soluble adjuvants may be used in combination with the fertilizer, such as other nutrients, fungicides, algicides, weed killers, pesticides, etc. Suitable examples of water-soluble adjuvants are disclosed in U.S. Pat. No. 5,224,292, column 3–4, incorporated herein by reference. Since all of the nutrients may be supplied by a fertilizer, the soilless sod preferably excludes, i.e., is substantially free of composted materials (such as crushed bark and mushroom media), animal waste, mulch and sewage materials. The sod also preferably excludes, i.e., is substantially free of, non-biodegradable organic compounds, such as polystyrene marbles (such as those disclosed in U.S. Pat. No. 4,364,197, column 2), and mineral soil additives, such as sand, vermiculite and perlite.

After sprigging the mat, a scrim is preferably placed over the sprigs. The scrim layer increases the relative humidity around the sprigs and helps weigh them down into the mat, thus preventing them from moving off the mat. The scrim layer may also protect the sprigs from sunburn and/or dessication. The scrim layer is preferably translucent and/or biodegradable. Preferably, the scrim is light-colored and, more preferably, white. The scrim layer may be made of any suitable material. A biodegradable material is preferred. A scrim that degrades in 7 to 30 days is particularly preferred. A regenerated spun cellulose fiber scrim is particularly preferred. A rayon scrim is particularly preferred. The scrim layer preferably has a maximum thickness of 1 mil.

The sprigged mat is preferably grown over a root-impervious surface. This surface may also be water-impervious. The root-impervious surface may encourage the roots that grow through the mat to form an intermeshed network on the lower surface of the mat. Non-limiting examples of the root-impervious surface include plastic, concrete and asphalt. A plastic layer is preferred. The thickness of the plastic layer is not particularly limited. A preferred thickness is 2 to 10 mil.

The sprigs are allowed to grow until the desired level of mat coverage is achieved. The time required to reach the desired level of coverage will, of course, vary with the type of grass used and the growing condition, for example. Preferably, mat coverage is achieved in 3 to 20 weeks, more preferably 4 to 20 weeks and most preferably 5 to 18 weeks.

After growth is complete, the sod is a lightweight carpet of grass turf, which is easily rolled and transported. The sod may be applied on top of a soil substrate. The sod is preferably removed from the root-impervious layer before application to the soil substrate. The nature of the substrate is not particularly limited. Preferably, the substrate is a bare plot of soil. Particularly preferred substrates include athletic fields, golf courses and commercial and residential lawns. After application, the roots of the sod grow into the soil substrate to produce a lawn.

Having generally described this invention, a further understanding can be obtained by reference to certain specific examples which are provided herein for purposes of illustration only and are not intended to be limiting unless otherwise specified.

EXAMPLES

Example 1

Soilless Sod from Grass Sprigs

Materials and Methods

Two trials were performed during successive growing seasons. Stolons of bermudagrass (*Cynodon x magenissii* Hurc. 'MS Express'), centipedegrass [*Eremochloa ophiuroides* (Munro) Hack. 'Common'], St. Augustinegrass [*Stenotaphrum secundatum* (Walt.) Kuntze 'Raleigh'], and zoysiagrass (*Zoysia japonica* Steud. 'Meyer') were harvested from field plots at the Mississippi State University Plant Science Research Center (Starkville, Miss.) with a vertical mower. For the first trial, the sprigs were scattered at a rate of 0.5 $m^3$ are$^{-1}$ (14 bu 1000 ft$^{-2}$) on top of 1.2 $m^2$ pieces of commercially available 100% kenaf mat (Mississippi MAT-Line/Agro-Fibers, Inc., Charleston, Miss.). This commercially available mat contained trace amounts of a UV degradable low melt polyester binding agent and starch polymer at 9.8 g $m^{-2}$ to improve water retention. Two or three layers of mat, consisting of 650 or 975 g $m^{-2}$ kenaf, respectively, were evaluated in this trial. The study was conducted on a 6 mil thick sheet of black plastic to prevent roots from penetrating into the soil.

As a comparison, soilless sod grown from seed was also produced. For the seeded plots, a commercially available pre-seeded top mat (Mississippi MAT-Line/Agro-Fibers, Inc., Charleston, Miss.) consisting of 50% kenaf and 50% wood fiber along with a starch polymer, was laid over either 325 or 650 g m$^{-2}$ of 100% kenaf mat as described above. Seed of bermudagrass (*Cynodon dactylon* (L.) Pers. 'AZ Common', centipedegrass ('Common'), St. Augustinegrass ('Raleigh'), and Zoysiagrass ('Sunrise') were applied at the rates recommended by Emmons (see Emmons, R., 1995, *Turfgrass Science and Management*, 2nd edition. Delmar Pub., Albany N.Y.).

In the second trial, mats used for the transplants were prepared at the Plant Science Research Center by floating the appropriate weights of kenaf fiber (325 g m$^{-2}$ per layer) on water in a wooden frame with a hardware cloth (6.4 mm mesh) bottom. No polyester binding agent or starch polymer were added.

Plots were fertilized monthly with Slo-Cote slow release 14-14-14 (Bonus Crop Fertilizer, Inc.) at 50 mg N m$^{-2}$ (1 lb 1000 ft$^{-2}$) and MicroMax Plus micronutrient mix (The O. M. Scotts Company) at 114.3 g m$^{-2}$ (26 lb 1000 ft$^{-2}$). Supplemental N was applied at 50 mg m$^{-2}$ (1 lb 1000 ft$^{-2}$) weekly. Sources alternated between ammonium nitrate (34-0-0) and 13-13-13. Irrigation was applied on an as needed basis to prevent mat dessication. Percent plot coverage was evaluated by visual estimation at 9 and 15 weeks after trial initiation in the first trial and at 4, 6, 8, and 10 weeks after trial initiation in the second trial.

The fertilization regime is a variable in this sod production system. The kenaf mat is essentially a nutrient-free environment having a pH of 5.5 to 6.0. Since most warm-season grass species are fairly well adapted to acid soil conditions, pH is not a concern, but all essential plant nutrients should preferably be supplied (see Turgeon, A. J., 1991, *Turfgrass Management*, 3rd ed. Regents/Prentice Hall, Englewood Cliffs, N.J.).

A completely randomized design was used for all trials with four replications per grass species and mat thickness. Means for percent plot coverage for the vegetatively established were calculated. Plot coverage values based on mat thickness were compared using Fisher's Protected LSD test at p≦0.05 as described in SAS Institute, 1989, *SAS/STAT User's Guide*, version 6, 4th ed., SAS Inst., Cary, N.C., incorporated herein by reference.

Once complete coverage of the bermudagrass was achieved, a transplant rooting study was conducted to compare bermudagrass mat to field-cut bermudagrass sod. Measurements of transplant rooting were determined using a modified procedure developed by King and Beard, Measuring Rooting of Sodded Turfs, *Agron. J.*, 61(4):497–498, (1969), incorporated herein by reference. Bare soil was tilled lightly to a depth of less than 1.3 cm one day prior to initiation of the study. Squares of fully established 'MS-Express' soilless and field-cut 'MS-Express' bermudagrass sod were cut to 0.09 m$^2$ (1 ft$^{-2}$) sections. Field-cut sod was harvested at a depth of approximately 1.3 cm.

Sod sections were placed on 0.3 m×0.3 m squares of expanded metal fitted with eyebolts at each corner. The transplanted sod was irrigated during the first week after transplanting as needed to prevent desiccation. At 7, 10, 14, and 17 days after transplanting, vertical force was applied to the metal plates by attaching each of the four corners to a single hook suspended beneath a hand-held scale and lifting until the rooted sod separated from the soil. The resulting resistance was an indication of the relative degree of sod rooting over time.

In the first trial, sixteen sod sections for both soilless sod (double thickness mat only) and field-cut sod were established. Four replications were lifted at each harvest date. In the second trial, 80 sod sections for both types of sod were established. Here, twenty replications of each sod square were lifted at each harvest date. All data were subjected to ANOVA, and mean separation procedures were performed when appropriate using Fishers's Protected LSD test as described in *SAS/STAT User's Guide*, cited above.

Results and Discussion

Species comparisons. At 9 weeks after study initiation, bermudagrass plots planted with stolons were near 100% coverage in the first trail, and within 6 weeks in the second trial (Table 1 and 2). Quick plot coverage was a result of the aggressive growth habit of the bermudagrasses. In both trials, stolons were applied at 0.5 m$^3$ are$^{-1}$. This soilless sod production period of 6 to 9 weeks is markedly superior to the traditional 3 to 12 month field-grown sod production period (see, for example, Hall, C. R., L. G. Kizer, J. V. Krans, T. D. Phillips, and G. E. Coats, 1988, *Economic and Agronomic Analysis of Mississippi Turfgrass Sod Farms*, MS Agric. and For. Expt. Stat. Agric. Ec. Res. Rept. 182, 1988).

By 15 weeks after initiation of the first trial, bermudagrass, centipedegrass, St. Augustinegrass and zoysiagrass plots planted with stolons were considered marketable (80% or greater coverage), while only those seeded with bermudagrass, centipedegrass and zoysiagrass were considered marketable (Table 1). Even though not all plots had 100% coverage, the integrity of the sod was such that plots with ≧80% coverage could be handled. Sod integrity was the result of the integration of roots, stolons, and rhizomes (where applicable) with the organic fiber mat. These results additionally show that the sprigged mats had a higher coverage as compared to the seeded mats.

Some of the other results obtained in the second trial (Table 2) may have been affected by several factors beyond our control: a later than desirable initiation date due to events at the mat manufacturing facility which resulted in slight modifications to the fiber mats content used in the study, and an irrigation failure that terminated the vegetative study after 8 weeks and the seeded study after 10 weeks. Additionally, the mat used in the seeded study contained more polyester binding agent, due to utilizing an alternate manufacturing plant, which increased the moisture retention of the mat substrate.

An irrigation failure terminated the vegetative study after 8 weeks and the seeded study after 10 weeks in the second trial (Table 2). At the time of termination, the vegetative plots showed some similarities and some differences from the results of the first trial. St. Augustinegrass had similar coverage in both trials, while centipedegrass and zoysiagrass had markedly less coverage than the previous trial (Table 2). The inferior zoysiagrass plot coverage was due to contamination of the source plots by common bermudagrass. This contamination led to competition from the more aggressive common bermudagrass. Fenoxaprop {(±)-2-[4-[(6-chloro-2- benzoxazolyl)oxy] phenoxy]propanoic acid} was applied six weeks after initiation (41 g a.i. ha$^{-1}$; 0.22 lb a.i. acre$^{-1}$) in an attempt to control the contamination, and though control was achieved, the chemical application resulted in decreased plot coverage at 8 weeks after establishment (Table 2). While the centipedegrass plot coverage was higher in the second trial as compared to the first, St. Augustinegrass and zoysiagrass showed lower coverage in the second trial as compared to the first, all at the same point in time (Table 2).

Planting material comparisons. In the first trial, the effect of planting material on soilless sod plot coverage at the end of the first trial (Table 1) tended to show little difference between vegetative plots and seeded plots, with the exception of St. Augustinegrass, where vegetative plots outperformed the seeded plots.

However, the results of the second trial show that mats sprigged with bermudagrass, St. Augustine or zoysiagrass establish much faster as compared to the corresponding seeded mats (Table 2). After four weeks, the mats sprigged with bermudagrass showed 66.0% coverage, while the corresponding seeded mat showed only 19.8% coverage. At six weeks, the sprigged mats were 96.3% covered as compared to only 63.6% coverage with the seeded mat. Similar results were observed with St. Augustine and zoysiagrass (Table 2).

Mat thickness comparisons. Percent plot coverage by species, based on mat weight, showed few significant differences in the first trial (Table 3). Only the 975 g m$^{-2}$ mats (three layers of mat) of centipedegrass at nine weeks showed superior coverage as compared to the 650 g m$^{-2}$ mats (Table 3). All other species tested showed no significant differences at both 9 and 15 weeks. Though differences are not statistically significant, the trend for better coverage favors the 975 g m$^{-2}$ plots, with the only exception being seeded zoysiagrass at 15 weeks.

Percent coverage of seeded plots in the second trial (Table 4) showed significant differences after the first 4 week observation period for bermudagrass, centipedegrass, and zoysiagrass, with three layer plots being superior to two layer plots. After the fourth week, only zoysiagrass plots showed any statistical differences, though the trend favored thicker mats. Sprigged plots in the second trial showed very few statistical differences favoring one substrate thickness over the other (Table 4). The better coverage observed with the thicker mats in the seeded grasses may be attributed to greater moisture retention over time, thereby decreasing chances for drought stress on excessively sunny or windy days.

Transplant Rooting. Rooting measurements were taken 7, 10, and 14 days after study initiation by measuring vertical resistance of the different sod types (Table 5). In the first trial, nearly identical results between MS Express bermudagrass soilless sod and field-cut sod were observed at 7 and 10 days. Large differences, though not statistically different, appeared at 14 days when soilless sod was compared to field-cut sod. The mat had nearly 1.5 times better rooting (as measured by resistance) than did field cut sod. In the second trial, the same trend was observed (Table 5), and at 14 days a statistical difference favoring the soilless sod became evident. Here, vertical resistance at 14 days exceeded the capabilities of the measuring device of each soilless sod plot. Data were entered at the maximum 1008 kg m$^{-2}$ for statistical analysis, however the actual values were larger.

Conclusion

The results above indicate that turfgrass sod can be successfully grown from grass sprigs on a kenaf-based organic fiber mat. Sprigging the kenaf mat can produce a marketable soilless sod within 15 weeks, and the sprigged mat generally establishes faster as compared to a seeded mat. In particular, vegetatively propagated fine textured bermudagrasses grown on kenaf-based mat may provide an alternative to washed sod for establishment situations for golf and sports turfs on sand-based soils where layering of different textured soils can be a concern.

Soilless sod transplant rooting was faster than field-cut sod as measured by resistance. Because of the nature of the root system, severed roots in field-cut sod are replaced by newly initiated roots from the crown, but because soilless sod is not damaged during harvest, a new root system is not necessary, resulting in quicker establishment time.

The integrity and ease of handling that kenaf-fiber mat adds to soilless sod is a characteristic that straw, finely crushed wood bark compost, or secondary sewage sludge cannot provide. Kenaf-fiber mat is also a bio-organic, renewable resource capable of environmental degradation that hollow synthetic fibers does not offer.

Obviously, numerous modifications and variations of the present invention are possible in light of the above teachings. It is therefore to be understood that within the scope of the appended claims, the invention may be practiced otherwise than as specifically described herein.

TABLE 1

Percent plot coverage for seeded or vegetatively established warm-season turfgrasses at 9 and 15 weeks after establishment in the first trial.

| | 9 weeks[2] | | 15 weeks | |
| --- | --- | --- | --- | --- |
| Species | Seeded[2] | Stolons[y] | Seeded | Stolons |
| | mean % coverage | | | |
| Bermudagrass | 91.4[y] | 97.5 | 100.0 | 98.8 |
| Centipedegrass | 65.0 | 80.6 | 98.1 | 98.8 |
| St. Augustinegrass | 33.8 | 68.8 | 70.6 | 90.6 |
| Zoysiagrass | 59.4 | 80.0 | 88.8 | 95.7 |

[2]Seeded at rates of 2.2 kg of pure live seed/93 m$^2$ (1 pound/1000 ft$^2$).
[y]Vegetative establishment rates of 0.5 m$^3$ are$^{-1}$ for all species.

TABLE 2

Percent plot coverage for seeded or vegetatively established warm-season turfgrasses at 4, 6, 8 and 10 weeks after establishment for all observation dates in the second trial.

| Species | 4 weeks seeded[z] | 4 weeks stolons[y] | 6 weeks seeded | 6 weeks stolons | 8 weeks seeded | 8 weeks stolons | 10 weeks seeded | 10 weeks stolons[x] |
|---|---|---|---|---|---|---|---|---|
| | | | | mean % coverage | | | | |
| Bermudagrass | 18.9[z] | 66.9 | 63.6 | 96.3 | 70.0 | 100.0 | 80.4 | —[w] |
| Centipedegrass | 13.6 | 11.4 | 68.8 | 22.1 | 75.8 | 39.6 | 85.4 | —[w] |
| St. Augustine | 11.8 | 18.8 | 7.5 | 38.1 | 7.5 | 69.4 | 10.4 | —[w] |
| Zoysiagrass | 7.9 | 23.4 | 22.9 | 56.9 | 30.4 | 26.3 | 40.8 | —[w] |

[z]Seeded at rates of 2.2 kg of pure live seed/93 m$^2$ (1 pound/1000 ft$^2$).
[y]Vegetatively established with stems at 0.5 m$^3$ are$^{-1}$ for all species.
[x]Data not collected due to irrigation failure.

TABLE 3

The effect of kenaf-based mat thickness on plot coverage of seeded and vegetatively established turfgrasses planted in the first trial.

| | Seeded[s] | | | Stolons[y] | | |
|---|---|---|---|---|---|---|
| | Double | Triple | LSD (0.05) | Double | Triple | LSD (0.05) |
| | | | mean % coverage | | | |
| 9 weeks | | | | | | |
| Bermudagrass | 80.00 | 100.00 | NS | 95.00 | 100.00 | NS |
| Centipedegrass | 48.75 | 81.25* | 24.75 | 77.50 | 83.75 | NS |
| St. Augustinegrass | 23.75 | 43.75 | NS | 62.50 | 75.00 | NS |
| Zoysiagrass | 51.25 | 67.50 | NS | 71.67 | 86.25 | NS |
| 15 weeks | | | | | | |
| Bermudagrass | 100.00 | 100.00 | NS | 97.50 | 100.00 | NS |
| Centipedegrass | 96.25 | 100.00 | NS | 100.00 | 97.50 | NS |
| St. Augustinegrass | 60.00 | 81.25 | NS | 82.50 | 98.75 | NS |
| Zoysiagrass | 91.25 | 86.25 | NS | 95.00 | 96.25 | NS |

[x]Double thick mat = 650 g m$^{-2}$, triple thick mat = 975 g m$^{-2}$.
[y]Vegetatively established with stolons at 0.5 m$^3$ are$^{-1}$ for all species.
[z]Seeded rates of 2.2 kg of pure live seed/93 m$^2$ (12 pound/1000 ft$^2$).
[NS]*Mat thickness within species and planting methods are significant at the 0.05 probability level; [NS] = nonsignificant.

TABLE 4

The effect of kenaf-based mat thickness on plot coverage of seeded and vegetatively established turfgrass planted in the second trial.

| | Seeded[s] | | | Stolons[y] | | |
|---|---|---|---|---|---|---|
| | Double | Triple | LSD (0.05) | Double | Triple | LSD (0.05) |
| | | | mean % coverage | | | |
| Weeks for planting | | | | | | |
| Week 4 | | | | | | |
| Bermudagrass | 11.4 | 26.4* | 11.0 | 72.5 | 61.3 | NS |
| Centipedegrass | 7.1 | 20.0*** | 4.7 | 9.3 | 13.6 | NS |
| St. Augustinegrass | 9.3 | 14.3 | NS | 18.1 | 19.4 | NS |
| Zoysiagrass | 5.0 | 10.7*** | 2.8 | 27.5 | 19.4** | 5.1 |
| Week 6 | | | | | | |
| Bermudagrass | 53.6 | 73.6 | NS | 96.3 | 96.3 | NS |
| Centipedegrass | 56.0 | 77.9 | NS | 16.4 | 27.9* | 10.5 |
| St. Augustinegrass | 7.1 | 7.9 | NS | 39.4 | 36.9 | NS |
| Zoysiagrass | 15.0 | 28.6* | 10.8 | 61.3 | 52.5 | NS |
| Week 8 | | | | | | |
| Bermudagrass | 62.9 | 77.1 | NS | —[y] | — | — |
| Centipedegrass | 64.0 | 84.3 | NS | 60.0 | 49.3 | NS |
| St. Augustinegrass | 7.1 | 7.9 | NS | 39.4 | 36.9 | NS |
| Zoysiagrass | 22.0 | 36.4* | 12.5 | 32.5 | 20.0* | 12.5 |
| Week 10 | | | | | | |
| Bermudagrass | 76.4 | 84.3 | NS | | | |
| Centipedegrass | 77.0 | 91.4 | NS | | | |
| St. Augustinegrass | 10.0 | 10.7 | NS | | | |
| Zoysiagrass | 34.0 | 45.7** | 7.0 | | | |

[x]Double thick mat = 650 gm$^{-2}$, triple thick mat = 975 gm$^{-2}$.
[y]Vegetatively established with stolons at 0.5 m$^3$ are$^{-1}$ for all species.
[z]Seeded at rates of 2.2 kg of pure live seed/93 m$^2$ (1 pound/1000 ft$^2$).
*, , *, [NS]Mat thickness within species and planting methods are significant at the 0.05, 0.01, or 0.002 probability level;
[NS]= nonsignificant.

TABLE 5

Transplant rooting of soilless and field-cut 'MS-Express' bermudagrass sod at 7, 10 and 14 days after transplanting (DAT) in the first and second trials.

| | DAT | | |
|---|---|---|---|
| | 7[z] | 10 | 14 |
| | Kg m$^{-2}$ | | |
| First Trial | | | |
| Soilless sod | 276 | 441 | 835 |
| Field-cut sod | 241 | 434 | 535 |

TABLE 5-continued

Transplant rooting of soilless and field-cut 'MS-Express' bermudagrass sod at 7, 10 and 14 days after transplanting (DAT) in the first and second trials.

| | DAT | | |
|---|---|---|---|
| | 7[2] | 10 | 14 |
| LSD (0.05) Second Trial | NS | NS | NS |
| Soilless sod | 260 | 357 | >1008 |
| Field-cut sod | 228 | 372 | 794*** |
| LSD (0.05) | NS | NS | 80 |

*Mean of plots based on resistance to applied vertical force.
NS, *Means within the same row and year are not significant (NS) or significant (*) at the 0.001 probability level.

What is claimed as new and desired to be secured by Letters Patent on the United States is:

1. A sod precursor, comprising:
   grass sprigs; and
   a non-woven mat comprising bio-cellulosic bast fibers, the sprigs being in contact with an upper surface of the mat, wherein said bast fibers comprise at least 40% by weight cellulose and said mat comprises at least 40% by weight of said bio-cellulosic bast fibers, and wherein said sod precursor is soil-free and grass seed-free.

2. The sod precursor of claim 1, wherein the bio-cellulosic fibers are selected from the group consisting of kenaf, roselle, flax, hemp, Chinese jute, jute, ramie, Sunn hemp, nettle and mixtures thereof.

3. The sod precursor of claim 1, wherein the bio-cellulosic fibers comprise kenaf.

4. The sod precursor of claim 1, wherein the mat comprises 95 to 100% by weight of kenaf fibers.

5. The sod precursor of claim 1, wherein the sprigs are of a warm season grass.

6. The sod precursor of claim 1, wherein the sprigs are of a grass selected from the group consisting of bermudagrass, bahaigrass, centipedegrass, St. Augustinegrass, zoysiagrass, carpetgrass, creeping bentgrass and mixtures thereof.

7. The sod precursor of claim 1, wherein the sprigs are of a grass that is incapable of reproducing by seeds.

8. The sod precursor of claim 7, wherein the sprigs are of bermudagrass or zoysiagrass.

9. The sod precursor of claim 1, which is substantially free of composted materials, animal waste, mulch and sewage materials.

10. A method of producing a soil- and grass seed-free sod precursor, comprising:
    applying grass sprigs to a non-woven mat, wherein the mat comprises bio-cellulosic fibers and is substantially free of soil and grass seeds.

11. A method of producing a soilless sod comprising providing the sod precursor of claim 1 with essential nutrients and water.

12. The method of claim 11, wherein a scrim is applied over the sprigs.

13. The method of claim 11, wherein the sod is grown on a root-impervious surface.

14. The soil-free sod produced according to claim 11.

* * * * *